Nov. 17, 1970  J. J. FATULA  3,540,159
BELT GRINDER
Filed Sept. 3, 1968  4 Sheets-Sheet 1
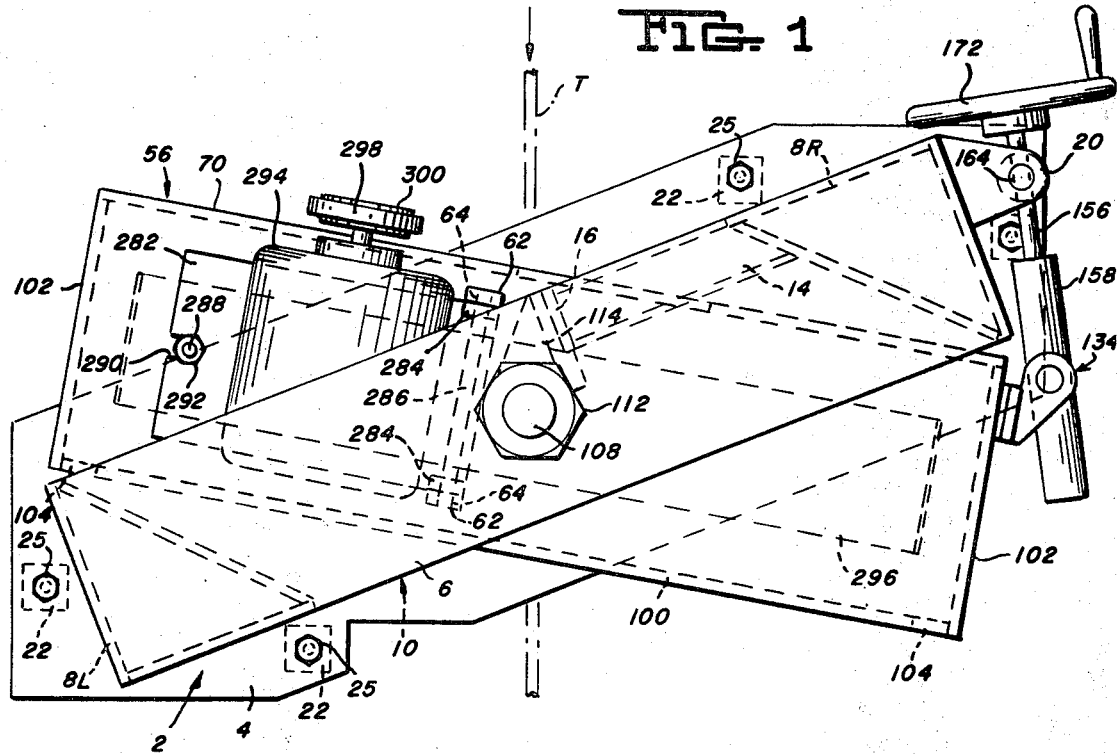
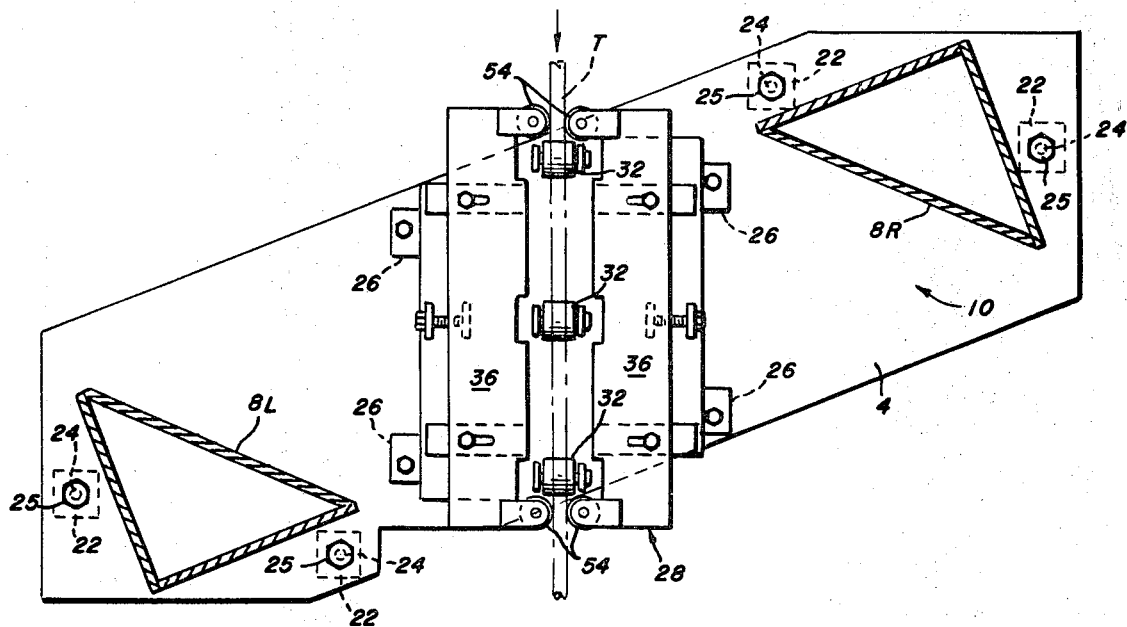
INVENTOR
JAMES J. FATULA
By Martin J. Carroll
Attorney

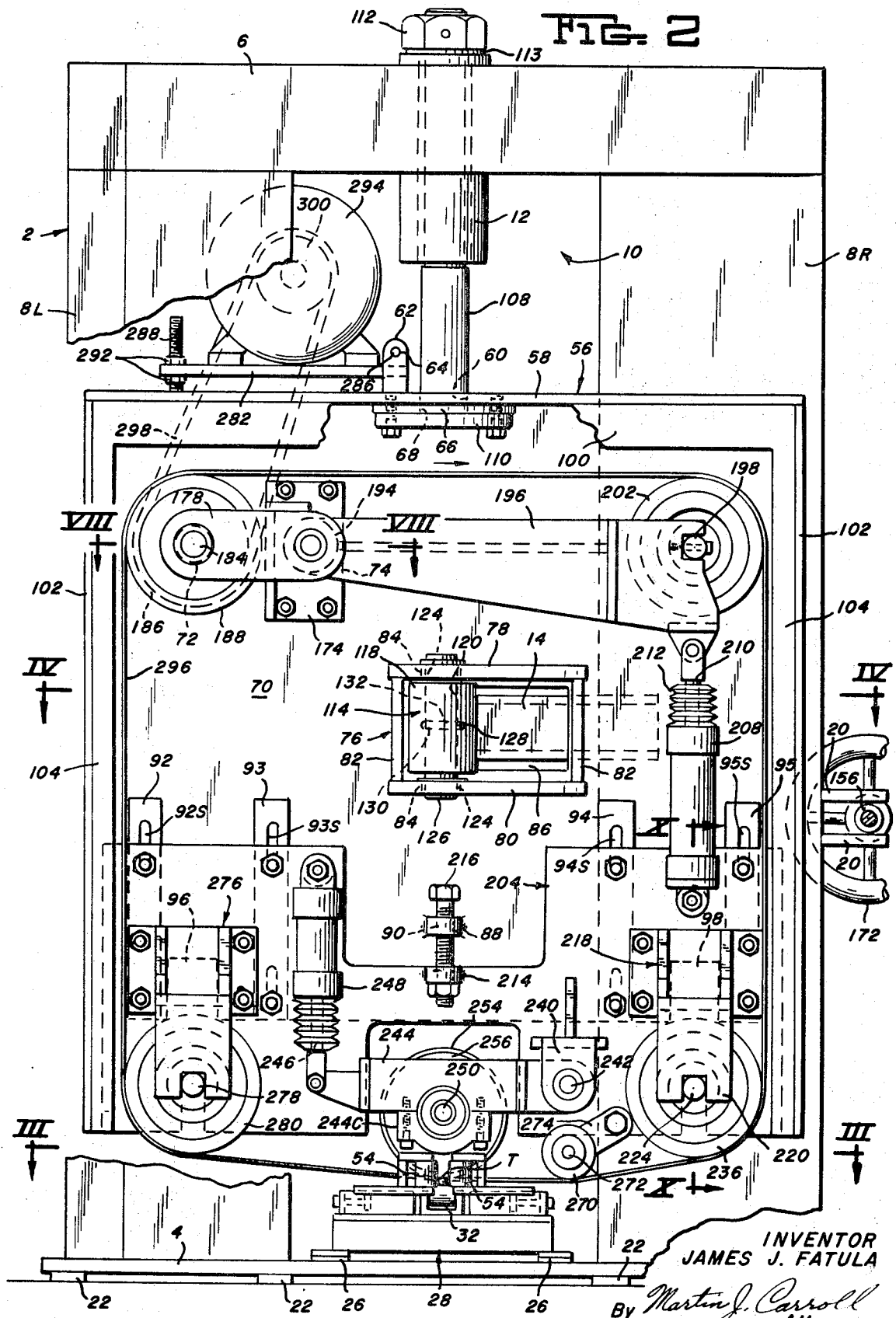

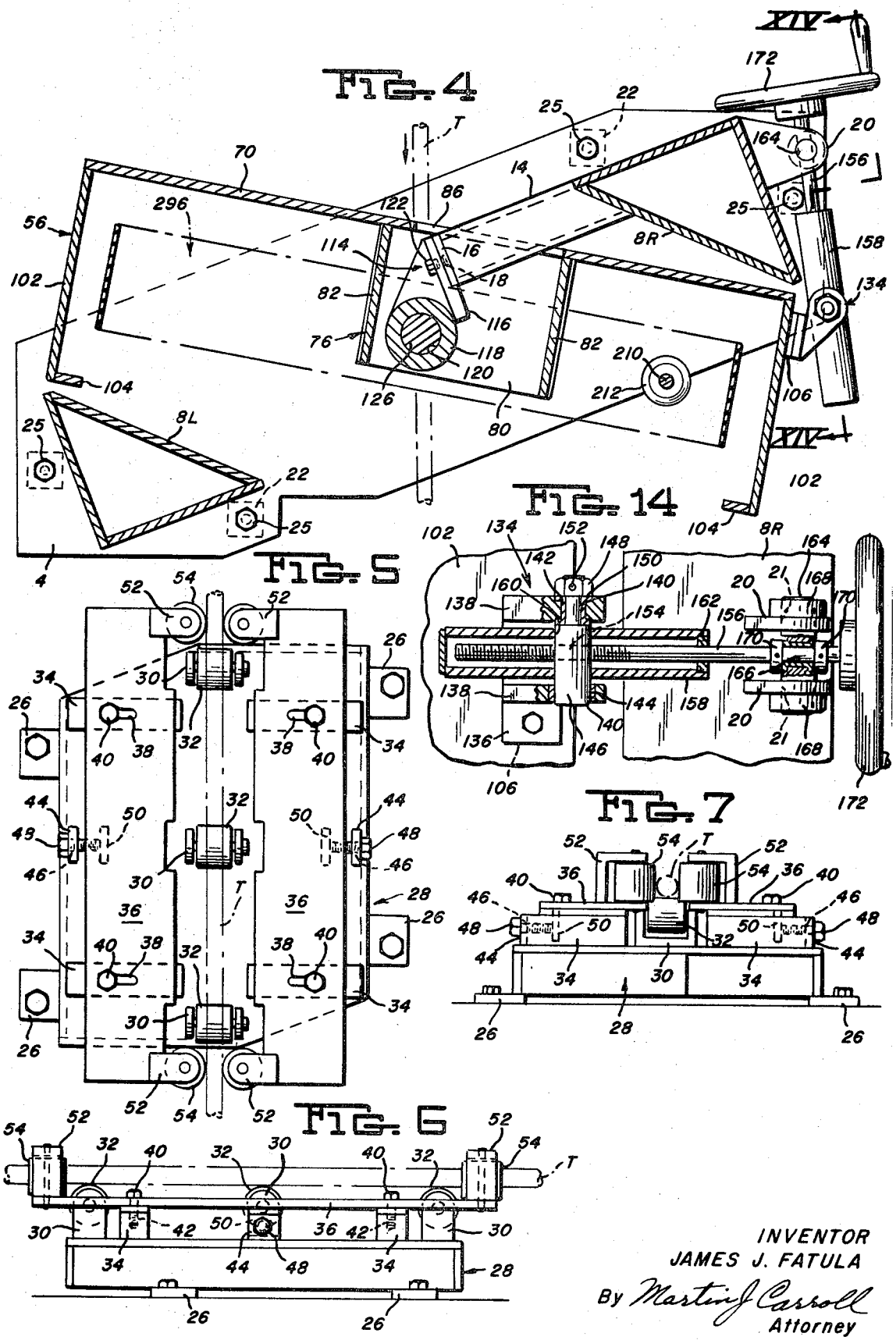

Nov. 17, 1970    J. J. FATULA    3,540,159
BELT GRINDER
Filed Sept. 3, 1968    4 Sheets-Sheet 4
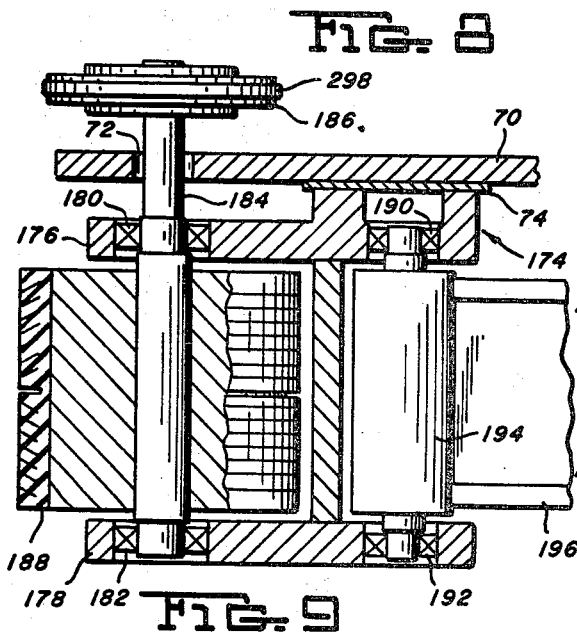
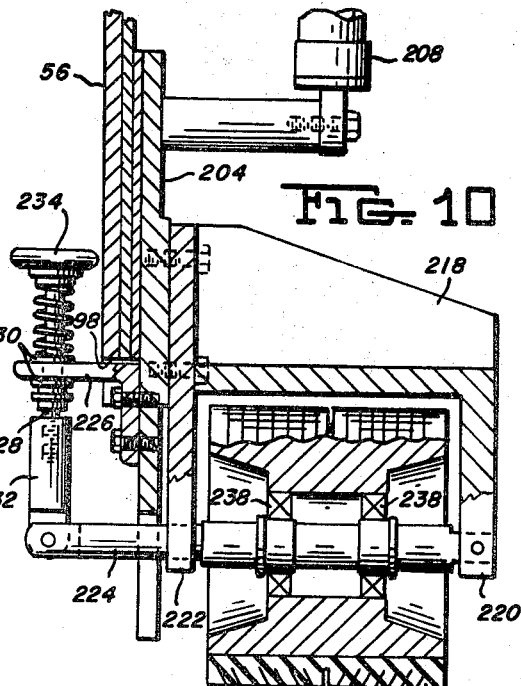
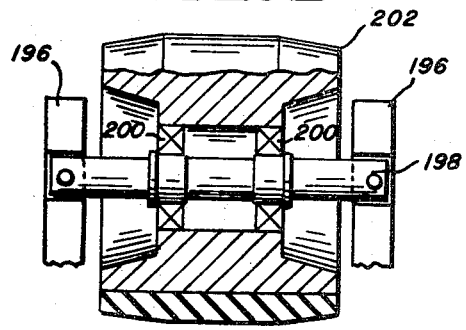
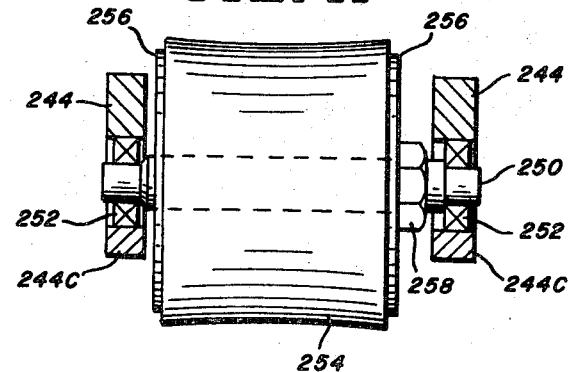
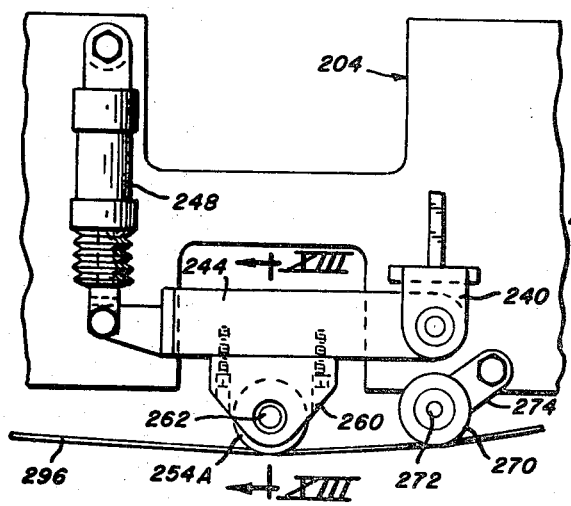
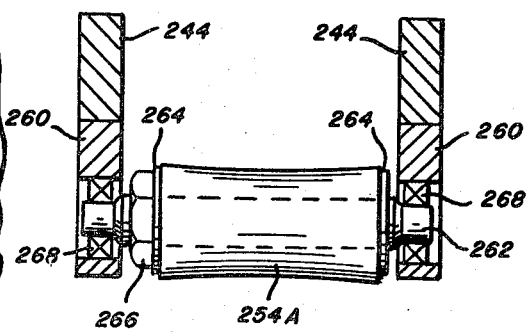
INVENTOR
JAMES J. FATULA
By Martin J. Carroll
Attorney

United States Patent Office 3,540,159
Patented Nov. 17, 1970

3,540,159
BELT GRINDER
James J. Fatula, Perry Township, Lawrence County, Pa.,
assignor to Ryman Engineering Company, a corporation of Pennsylvania
Filed Sept. 3, 1968, Ser. No. 756,977
Int. Cl. B24b 21/12
U.S. Cl. 51—141                               10 Claims

ABSTRACT OF THE DISCLOSURE

A belt grinder for removing oxides and surface irregularities from the weld area of a welded tube including an endless abrasive belt passing around a plurality of rolls one of which has a concave outer surface to trough the belt, and means for moving the tube axially into contact with the troughed belt at an angle thereto so that the belt contacts the tube for a substantial distance on one side of the transverse center of the belt to a substantial distance on the other side of the transverse center.

This invention relates to a belt grinder and more particularly to a grinder for removing oxides and surface irregularities from the weld area of a welded tube. For some uses it is desired that a welded tube have a smooth cylindrical outer surface free of irregularities. Prior to my invention the common practice was to remove the oxides and irregularities by means of a cutter or knife, but this was unsatisfactory for several reasons among which are the slowness and expense of the operation. It was also attempted to remove the oxides and irregularities by means of a belt grinder, but those available did not do a satisactory job. For example, it would result in flat spots on the tube and/or the belt life would be short.

It is therefore an object of my invention to provide a belt grinder for removing oxides and surface irregularities from the outer surface of a welded tube moving at a high speed.

Another object is to provide such a grinder that performs its function efficiently and accurately at a relative low cost.

Still another object is to provide such a grinder that utilizes a large portion of the width of the belt.

These and other objects will be more apparent after referring to the following specification and attached drawings, in which:

FIG. 1 is a top plan view of the belt grinder of my invention;

FIG. 2 is a front elevation of FIG. 1 with parts of the housing broken away and with the part shown as though the fronts of the grinder housing and frame were in parallel planes;

FIG. 3 is a view taken on the line III—III of FIG. 2;

FIG. 4 is a view taken on the line IV—IV of FIG. 2;

FIG. 5 is a plan view of the feeding mechanism;

FIG. 6 is a side elevation of FIG. 5;

FIG. 7 is a front elevation of FIG. 5;

FIG. 8 is a view taken on the line VIII—VIII of FIG. 2;

FIG. 9 is a sectional view through the belt supporting roll and mounting at the top right of FIG. 2;

FIG. 10 is a view taken on the line X—X of FIG. 2;

FIG. 11 is a sectional view through the contact roll of FIG. 2;

FIG. 12 is a partial elevation showing a contact roll of a different size and its support;

FIG. 13 is a sectional view taken on the line XIII—XIII of FIG. 12; and

FIG. 14 is a sectional view taken on the line XIV—XIV of FIG. 4.

Referring more particularly to FIGS. 1 to 7 of the drawings, reference numeral 2 indicates the grinder housing which includes a base plate 4, a top box girder 6 made of steel plates welded together, and two triangular box columns 8R and 8L extending between and welded to plate 4 and girder 6 so as to provide an opening 10. A round tube 12 extends vertically through the center of girder 6 for a purpose which will appear later. A rectangular tube 14 welded to column 8R intermediate its length extends horizontally into opening 10 less than half way and has its free end closed by a plate 16 having two threaded holes 18 therethrough one above the other. Two spaced apart horizontal brackets 20 are welded to the outside of column 8R slightly below tube 14 and have aligned holes 21 therein (FIG. 14). Plates 22 welded to the bottom of plate 4 have holes 24 therein aligned with similar holes in plate 4 for receiving anchor bolts 25. Four pads 26 are welded to the top of plate 4 and have a tube support 28 mounted thereon. As best shown in FIGS. 5 to 7 the support 28 includes three aligned U-shaped brackets 30 for rotatably supporting rollers 32. A welded tube T is fed to the rollers 32 by means, not shown, and is carried thereover at high speeds such as 300 ft. per minute. It will be noted that the rollers 32 are aligned with their transverse centers in the same plane as the axis of tube 12. Four plates 34 are welded to the top of tube support 28 for adjustably receiving opposed tube holder brackets 36, one on each side of the tube pass line. Two spaced apart slots 38 are provided in each bracket 36 for receiving cap screws 40 which are threaded to threaded holes 42 in plates 34 to hold the brackets 36 in adjusted position. Vertical plates 44 having threaded openings 46 therethrough are arranged one on each side of the center roll 32. A cap screw 48 threaded through opening 46 bears against a downwardy extending plate 50 on the associated bracket 36 to move the brackets toward each other. A U-shaped roller support 52 is provided at each end of each bracket 36. A vertical roller 54 is rotatably supported in each bracket 36 so as to guide the tube T in as it travels through the grinder.

A grinder frame 56 is pivotally mounted in the opening 10 of housing 2 for movement about a vertical axis. The frame 56 includes a top plate 58 having a vertical center hole 60 therethrough and spaced brackets 62 welded thereto and extending upwardly therefrom with aligned holes 64 extending therethrough. A round plate 66 with a hole 68 therethrough is secured to the bottom of plate 58 with hole 68 aligned with hole 60. A back plate 70 is welded to plate 58 and extends downwardly therefrom. A hole 72 is provided in plate 70 adjacent its top left corner and a mounting plate 74 is secured to the inside of plate 70 adjacent hole 72. A bracket 76 having top plate 78 and bottom plate 80 connected by vertical plates 82 is welded to the inside of plate 70 intermediate its ends and has vertical holes 84 therein in alignment with holes 60 and 68. The bracket 76 surrounds an opening 86 in plate 70. A nut 88 is welded to the inside of plate 70 with its threaded opening 90 on the vertical centerline of the frame 56. Plates 92 and 93 are welded to the inside of plate 70 on one side of nut 88 and plates 94 and 95 on the other side of the nut 88. Vertical slots 92S, 93S, 94S and 95S extend through plate 70 and plates 92, 93, 94 and 95, respectively. Rectangular openings 96 and 98 are provided in plate 70 between plates 92 and 93 and plates 94 and 95, respectively. A vertical plate 100 is welded to the underside of plate 58 at its front side and extends downwardly a short distance. Side plates 102 are welded to and extend forwardly from back plate 70. Vertical plates 104 are welded to the front side of plates 102. Additional welds may be provided as desired where the plates of frame 56 abut. A plate 106 is secured to the outside of right side plate 102 adjacent the rear thereof for a purpose which will appear later.

A pivot shaft 108 extends through tube 12 and holes 60 and 68. A flange 110 on the lower end of shaft 108 is bolted to plates 58 and 66 of frame 56. A nut 112 is threaded on the top end of shaft 108 and locked in place thereon with a bronze spacer 113 being provided between the nut and the top of the tube 12. The shaft 108 can rotate within tube 12. As best shown in FIGS. 2 and 4, a bracket 114, which includes a plate 116 welded to a tube 118 having a vertical hole 120 therein, is fastened to plate 16 by means of cap screws 122 passing through holes in plate 116 and threaded into holes 18. A flanged bronze bushing 124 is secured in each hole 84 and a shaft 126 passes through bushings 124 and hole 120 in bracket 114. A spring pin 128 passes through holes 130 in bracket 114 and hole 132 in shaft 126. Thus, frame 56 is supported for pivoted movement about the axes of shafts 108 and 126.

As best shown in FIGS. 4 and 14, a bracket 134 including a plate 136 and vertically spaced flanges 138 with aligned holes 140 therein is secured to plates 102 and 106 with plate 136 bearing against plate 106. Bushings 142 and 144 are provided in top and bottom holes 140 and a pin or in-feed screw nut 146 is mounted in the bushings. A nut 148 is threaded on the top of pin 146 and rests on thrust washer 150. A spring pin 152 locks the nut 148 in place. A threaded horizontal opening 154 is provided in pin 146 for receiving the threaded portion of a feed screw 156. A tubular shield 158 surrounds screw 156 and has a vertical hole 160 therethrough for receiving pin 146. A seal 162 closes the opening between screw 156 and shield 158. A vertical shaft 164 passes through holes 21 in brackets 20 and has a horizontal hole 166 therethrough for receiving screw 156. Set collars 168 lock shaft 164 in place and set collars 170 are provided on screw 156 on each side of hole 166 to prevent longitudinal movement of screw 156. A handwheel 172 is provided on the end of screw 156. Rotation of handwheel 172 rotates screw 156 so as to cause pivotal movement of frame 56 with respect to housing 2.

As shown in FIGS. 2 and 8, a bracket 174 is secured to plates 70 and 74 in any suitable manner such as by capscrews. The bracket 174 includes two spaced apart vertical bearing supports 176 and 178. Aligned holes in supports 176 and 178 have bearing 180 and 182 therein with their axes in alignment with hole 72. A shaft 184 is rotatably supported in bearings 180 and 182 and passes through opening 72 with a pulley 186 on its outer end. A rubber covered roll 188 is mounted on shaft 184 between bearing supports 176 and 178. Spaced from shaft 184 in supports 176 and 178 are a second set of aligned holes which have bearings 190 and 192 therein for rotatably supporting a pivot pin 194. A bifurcated arm 196 is secured to pin 194 for rotation therewith and extends away from roll 188. As best shown in FIG. 9, a shaft 198 is secured to the end of bifurcated arm 196 and has bearings 200 thereon for rotatably supporting a rubber covered roll 202. A bracket 204 (FIG. 2) is adjustably secured to plates 92 to 95 by means of bolts passing through the elongated slots 92S, 93S, 94S and 95S into holes in bracket 204. An air cylinder 208 is pivotally mounted on bracket 204 with its piston rod 210 secured to arm 196. A boot 212 preferably surrounds piston rod 210 to keep dirt out. A nut 214 is welded to bracket 204 with an adjusting screw 216 passing through aligned nuts 88 and 214. To adjust the vertical position of bracket 204 it is only necessary to loosen the bolts passing through slots 92S, 93S, 94S and 95S and then rotate the adjusting screw 216 in the desired direction to raise or lower the bracket. When the desired position is reached the bolts are tightened to hold the bracket in position.

As shown in FIGS. 2 and 10, a bracket 218 having downwardly extending spaced apart arms 220 and 222 is secured to bracket 204 in any suitable manner. One end of a shaft 224 is pivotally supported on outer arm 220 with its other end being pivotally supported on frame 56. For this purpose an angle 226 is secured to frame 56, with one leg horizontal. An alignment screw 228 passes through a hole in the horizontal leg of angle 226 and a collar 230 secured to screw 228 on each side of the angle leg prevents longitudinal movement of the screw. The lower end of screw 228 is threaded into rod eye 232 which is pivotally connected to shaft 224. Rotation of screw 228 by means of handwheel 234 tilts shaft 224 in the desired direction. A rubber covered roll 236 is rotatably mounted on bearings 238 secured to the shaft 224.

As best shown in FIGS. 2 and 11, the mounting bracket 204 has a pair of spaced apart downwardly extending arms 240 thereon having aligned holes therein for rotatably supporting a pivot shaft 242. One end of contact roll bracket 244 is secured to shaft 242 for rotation therewith. The other end of bracket 244 is pivotally connected to piston rod 246 of an air cylinder 248 pivotally mounted on bracket 204. Roll shaft 250 is rotatably supported in bearings 252 secured in bracket 244 and bearing cap 244C. A concave contact roll 254 is mounted on shaft 250 and held in place between flanges 256 by means of nut 258 threaded on shaft 250. Roll 254 shown is for use with 1½ to 2½″ diameter tubes, and has a maximum outside diameter of 8″ with .150″ maximum concavity. The concave surface has a radius of 30 inches.

When grinding ½ to 1½ in. diameter tubes a smaller contact roll 254A is used. This roll has a maximum outside diameter of 3″ with .342″ maximum concavity. The cancave surface has a radius of 15⅝″. To support roll 254A, cap 244C is removed from bracket 244 and arms 260 fastened to bracket 244 in place thereof. Roll 254A is mounted on a shaft 262 and held in place between flanges 264 by means of nut 266 threaded on the shaft. The shaft 262 is rotatably supported in bearings 268 received in arms 260.

A roll 270 is rotatably mounted on a shaft 272 which in turn is secured to the free end of an arm 274 which is pivotally mounted on bracket 204. The pivot mounting is for adjustment only and the roll 270 is held in fixed position when the grinder is operating.

A bracket 276, identical to bracket 18, is secured to bracket 204 and supports a shaft 278 which in turn rotatably supports a rubber covered roll 280.

A motor plate 282 having spaced apart legs 284 at one end is pivotally connected to spaced brackets 62 by means of pin 286 passing through holes in the brackets 62 and legs 284. The other end of plate 282 is supported by an adjusting screw 288 threaded into frame 56 and passing through a slot 290 in plate 282 with nuts 292 threaded on screw 288 on opposite sides of the plate. A motor 294 is mounted on plate 282. An abrasive belt 296 passes around rolls 188, 202, 236, 254 or 254A, and 280 with roll 270 bearing on the belt between rolls 236 and 254. A drive belt 298 passes around sheave 186 and a sheave 300 on the shaft of motor 294.

Rolls 188 and 236 are preferably self-centering rolls of the type shown in Lorig Pat. No. 2,772,879 dated Dec. 4, 1956 and rolls 202 and 280 are preferably narrow bodied rolls having a cylindrical center portion and end portions tapering outwardly from the center portion to a smaller diameter at the ends of the roll.

In operation, the plate 282 is positioned by nuts 292 to obtain the desired tension on drive belt 298. The bracket 204 is moved to the position suited for the particular size tube being ground and air is applied to the lower end of cylinder 208 to get the abrasive belt 296 to the desired tautness. The angularity of roll 236 is adjusted as required for best operation of belt 296. Roll 270 is moved to a position which will prevent gathering of the belt 296 and then locked in position. The frame 56 is moved with respect to housing 2 by turning handwheel 172 (FIGS. 1, 4 and 14) to obtain the desired angular relationship. The brackets 36 (FIGS. 5 to 7) are moved to the desired position for the size of tube T being machined and locked in place. The abrasive belt 296 assumes the shape of the concave surface of the contact roll as it passes thereover. The machine is then ready for operation and the tube T being ground is fed over rolls 32 and held in alignment by edge rollers 54. Since the tube T moves axially into contact with the belt 296 at an angle thereto rather than normal or axial it contacts a considerable width of the belt rather than a very restricted width. Thus, when the tube T first contacts the belt 296 on contact roll 254 it will be off center of the contact roll, but will be on the center of the belt and contact roll when it reaches the center of the contact roll, and off center on the opposite side as it leaves the roll. If more pressure of the belt on the workpiece is desired, it is obtained by applying air to the top of cylinder 248. The arrangement shown and described results in the ground surface of the tube being round without flat spots.

While one embodiment of my invention has been shown and described, it will be apparent that other adaptations and modifications may be made without departing from the scope of the following claims.

I claim:

1. Apparatus for grinding a portion of the outer surface of an elongated cylindrical member comprising an endless abrasive belt, a plurality of rolls including a contact roll about which said abrasive belt passes, means for driving one of said rolls to cause said belt to move over said rolls, said contact roll having an arcuate concave outer surface with the radius of said surface being substantially greater than the radius of the cylindrical member being ground, and means for movably guiding said cylindrical member axially into contact with the belt on said contact roll in the general direction of and at an acute angle with respect to the axis thereof.

2. Apparatus according to claim 1 in which the number of rolls in addition to the contact roll is four including two upper and two lower rolls, said contact roll being located between the two lower rolls.

3. Apparatus according to claim 2 including a roll on the approach side of said contact roll bearing against the inside of said belt to direct the belt in a generally horizontal direction.

4. Apparatus according to claim 3 including a housing, a grinder frame mounted on said same housing for movement about a vertical axis, and means for moving said frame about its axis and locking it in place, all of said rolls being mounted on said frame.

5. Apparatus according to claim 4 in which the means for movably grinding said cylindrical member axially into contact with the belt on said contact roll at an angle thereto includes spaced apart rollers mounted on said housing adjacent the bottom thereof.

6. Apparatus according to claim 5 including a bracket on the lower end of said frame, and means for varying the vertical position of said bracket on said frame, the two lower rolls, the contact roll and the roll on the approach side of said contact roll being mounted on said bracket.

7. Apparatus according to claim 6 including means for varying the pressure of said contact roll on said belt.

8. Apparatus according to claim 7 in which the means for driving one of said rolls to cause said belt to move over the said rolls is a motor mounted on said frame.

9. Apparatus according to claim 4 including a bracket on the lower end of said frame, and means for varying the vertical position of said bracket on said frame, the two lower rolls, the contact roll and the roll on the approach side of said contact rolls being mounted on said bracket.

10. Apparatus according to claim 9 including means for varying the pressure of said contact roll on said belt.

References Cited
UNITED STATES PATENTS

| | | | |
|---|---|---|---|
| 975,088 | 11/1910 | Thompson | 51—139 |
| 1,198,136 | 9/1916 | Ladd | 51—140 |
| 2,129,952 | 12/1938 | Giles | 51—141 |
| 2,469,735 | 5/1949 | Lindsay et al. | 51—141 |

OTHELL M. SIMPSON, Primary Examiner

U.S. Cl. X.R.

51—148